Feb. 4, 1930.  E. B. HIGGINS  1,745,421
APPARATUS FOR USE IN CARRYING OUT EXCHANGE REACTIONS
Filed Nov. 27, 1926  3 Sheets-Sheet 2

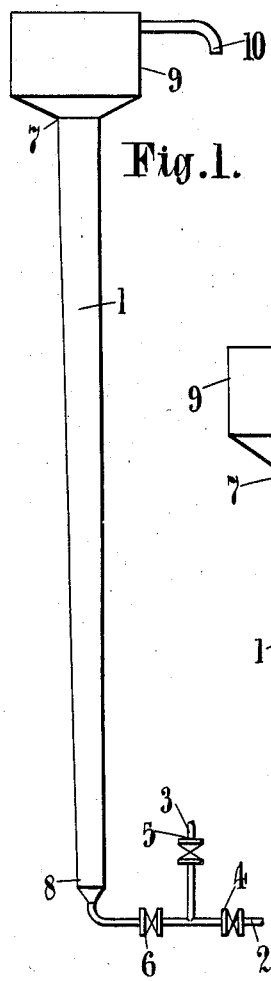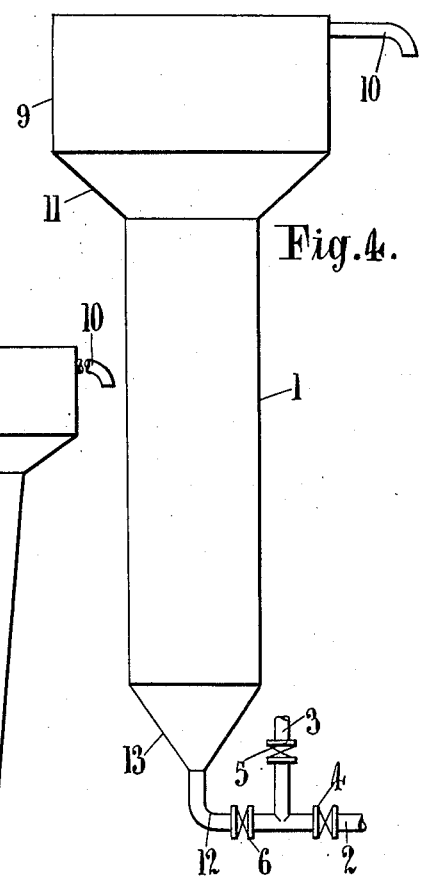

INVENTOR
Eric Berkely Higgins
BY
ATTORNEYS

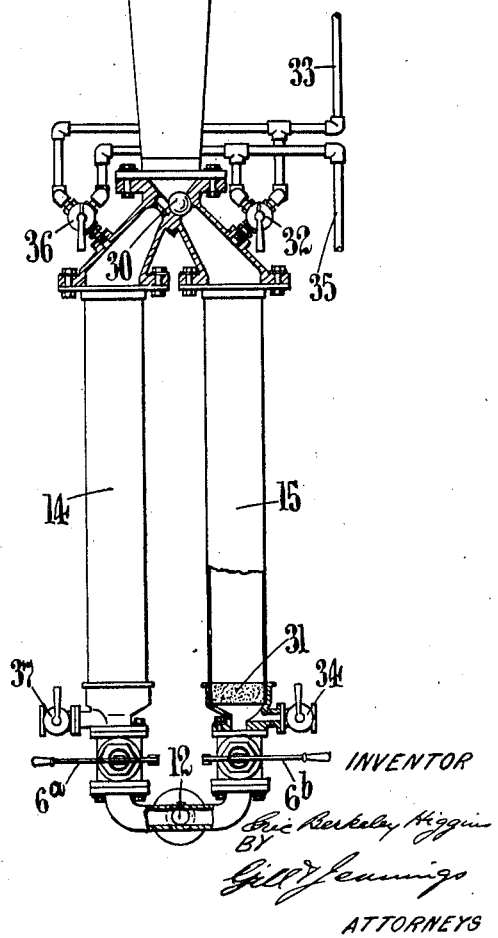

Patented Feb. 4, 1930

1,745,421

UNITED STATES PATENT OFFICE

ERIC BERKELEY HIGGINS, OF LONDON, ENGLAND, ASSIGNOR TO UNITED WATER SOFTENERS LIMITED, OF LONDON, ENGLAND, A BRITISH COMPANY

APPARATUS FOR USE IN CARRYING OUT EXCHANGE REACTIONS

Application filed November 27, 1926, Serial No. 151,114, and in Great Britain October 1, 1924.

This invention relates to apparatus for use in carrying out processes involving exchange reactions and this application is a continuation in part of application Serial No. 58,345, filed September 24th, 1925. The invention is concerned with reactions in which an exchange material is employed to take up a substance and, subsequently, by a reversal, is restored to its active condition by a process usually known as regeneration. An example of such a reaction to which the present invention has particular reference is the softening of water by base exchange materials. Such reactions are considered to be true chemical reactions or to depend upon adsorption or to have the characteristics of both according to the conditions under which the process is carried out. Generally speaking the exchange material, for example the water softening material, has hitherto been employed in practice in the form of a filter bed, the integrity of which has been maintained during the process. The suggestion has, however, been made to work with the material in suspension in the water, but such suggestion has not matured into practical use. There are certain drawbacks, however, inherent in the method of using exchange material in the form of a filter bed. First of all the process cannot be truly continuous because the softening reaction has to be stopped after a certain period, and the exchange material has to be regenerated to be rendered fully active again. Again, particles of the exchange material which are finer than a certain grade cannot be employed in a filter as they tend to form a mud which would quickly fill up the interstices and choke the filter bed. Thus, for this reason there is a considerable waste of material, such as glauconite, which cannot be used in water softening owing to the fineness of its constituent particles. Again, with relatively coarse particles lying in a filter bed, there is such an amount of contact that substantial parts of the surfaces of the particles, which might be active and take part in the reaction, are prevented from doing so as they cannot come into contact with the water. It is recognized that in order to promote adsorption it is more important to increase the free surface of the exchange material than it is to increase the time of the reaction. The chief objects of the present invention then are to enable such exchange reactions to be carried out in such a manner that the free active surface of the exchange body is increased as much as possible, to enable the exchange material to be employed no matter in how fine a condition it may exist, and also, as far as possible, to enable such reactions to be carried out in truly continuous cycles. The invention further aims at reducing in size the necessary plant to the utmost extent as compared with apparatus required for known processes and, finally, at reducing the amount of exchange material necessary to deal with a given amount of the material to be treated.

According to the present invention the apparatus in which an exchange reaction is carried out includes a treating vessel which increases in cross-sectional area towards the top either continuously or discontinuously and the exchange material is maintained in a state of suspension during the reaction by the liquid taking part in the reaction, being caused to flow upwardly through the treating vessel, that is to say, against the natural direction of fall of the exchange material. In the case of water softening, the exchange material may thus be maintained in a state of suspension by the upwardly flowing hard water, or it may be maintained in suspension during the regeneration process by the upward flow of the regenerating solution, usually common salt, or, of course, both parts of the process may be carried out while the exchange material is maintained in a state of suspension due to the upward flow of the respective liquids. By the present invention the net rate of fall of the exchange material is the difference between its natural speed of fall and the upward velocity of the liquid in question. The three cases which may arise in practice are as follows: If the upward velocity of the liquid is equal to the natural rate of fall of the exchange material, the actual rate of fall becomes zero, and in theory the exchange material remains stationary in space, and this condition can be sufficiently nearly approached in practice, although it is actually impossible to produce a flow of the liquid to be treated or of the regenerating liquid free from eddy currents. Secondly, the upward flow of the water may be at a velocity which is greater than the natural rate of fall of the exchange material. The actual rate of fall is negative, that is to say, the material moves upwardly in space at a velocity equal to the difference between the upward speed of the liquid and the natural rate of fall of the exchange material. Finally, the rate of upward flow of the liquid may be less than the natural rate of fall of the exchange material, and then the latter actually falls at a speed which is less than its natural rate of fall, being equal to the difference between its natural rate of fall and the upward velocity of the liquid. The time of contact between the exchange material and the liquid, as a whole to be treated, or the regenerating liquid, can be arranged as desired by suitable choice of the velocity of the liquid and by the length of the vessel or column in which the reaction takes place. If desired, the entire process, for example in the case of water softening, can be carried out in a complete cycle by arranging for the exchange material to come into contact with the parts of the water to be softened in succession, and then into contact with the regenerating liquid.

Some embodiments of the invention will now be described by way of example with reference to the accompanying drawings, wherein:—

Figure 1 is a diagrammatic elevation of one form of apparatus in accordance with the invention;

Figure 2 is a similar view showing a somewhat modified form of apparatus;

Figure 4 is a similar view showing an apparatus in which the cross-section of the treating vessel increases towards the top discontinuously;

Figure 6 is again a similar view showing a development of the apparatus illustrated in Figure 2 by means of which the process can be carried out in a manner approaching more nearly to a complete cycle;

Figure 8:
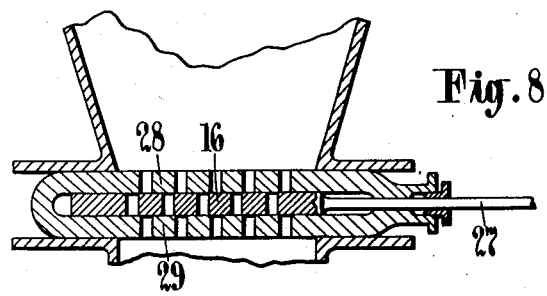

Figure 8 a central vertical section of a form of valve for use in the apparatus shown in Figure 6;

Figure 9 is a front elevation of a practical form of the apparatus shown in Figure 6.

In the embodiments illustrated in the drawings a treating vessel is illustrated so that the upward speed of the liquid column is equal at one point in the apparatus to the natural rate of fall of all the particles of the exchange material.

Referring first of all to Figure 1, a vessel 1 is employed, the cross-sectional area of which increases continuously from the bottom upward; in other words, the vessel 1 is in the form of a truncated cone with its vertex downward. A particular example may be considered wherein the base exchange material, for example glauconite, which has preferably been stabilized, for example by baking, has been graded by elutriation or otherwise so that none of its particles will move upwards in a stream of water moving at a linear velocity of 2.5 centimeters per second, and will not fall against a stream of water moving at 5 centimeters per second. This corresponds roughly with the glauconite wherein the particles will pass a sieve of 40 mesh but will be retained by a sieve of 60 mesh. The apparatus is arranged so that hard water may flow in by the pipe 2, and 10% common salt solution for regenerating purposes may flow in by the pipe 3. The pipe 2 has a stop valve 4, and the pipe 3 a stop valve 5, so that either or both of these supplies may be entirely shut off. The rate of flow of either of them upwardly through the vessel 1 is controlled by a regulating valve 6 and in the example under consideration it may be assumed that the valve 6 is set so that water or salt solution may flow through the apparatus at a rate of 2 gallons per minute.

Under these conditions the diameter of the vessel 1, at its upper edge at 7, may be 3 inches, giving a cross-sectional area corresponding to a linear velocity over the area of 2.5 centimeters per second at the rate of flow of the liquids mentioned above. Again, the diameter of the vessel 1, at its lower end at 8, may be $2\frac{7}{16}$ inches, which is calculated to give a cross-sectional area corresponding to a linear velocity over the area of 5 centimeters per second with the rate of flow of the liquids mentioned above. The height of the vessel 1, between the points 7 and 8, may be 6 feet, and the vessel is provided with an expansion 9 at its upper end, which may be 8 inches high from the point 7 to its upper edge, and may be 12 inches in effective diameter. The expansion 9 is provided with an outflow pipe 10.

The following cycle of operations may be performed in this apparatus. The valve 4 is closed and the valve 5 opened, for example for 30 seconds, during which time sufficient salt will have entered to regenerate the material, and then water allowed to flow first to waste by opening the valve 4 and shutting the valve 5 for say 3 minutes. This serves to wash out the brine from the glauconite in the vessel 1. The latter may contain approximately 8 kilograms of base exchange material. The water, after 3 minutes, is allowed to pass to a storage tank at will, and it will be found that the exchange material can soften water at the high rate of flow mentioned above, which is equal to an average metric flow of 135 meters per hour. Such an apparatus will deliver, for example with a hard water of 13 parts lime per 100,000, 28 to 30 gallons of soft water before regeneration is necessary, that is to say, in approximately 15 minutes.

If a coarser grade of base exchange material be employed, for example one in which none of its particles will move upwards in a stream of water moving upwards at 5 centimeters per second, and no particle will fall against a water stream flowing upwards at 10 centimeters per second, the only alteration in the apparatus described above that is necessary would be to change the diameters at the points 7 and 8 to respectively $3\frac{3}{16}$ inches and 2¼ inches. Such an apparatus would act as before except that its rate of softening would be equivalent to a mean metric flow of 270 meters per hour, and it would deliver its full charge of softened water in approximately 8 minutes, the feed of water to it being correspondingly increased to 3½ gallons per minute.

The apparatus can be used open or under pressure but, of course, in the latter case the salt solution must be admitted, and the base exchange material washed when the apparatus is not connected to the water pressure delivery service. The arrangements for making appropriate connections for this purpose are not shown in the drawings as they are obvious and, of course, form no part of the present invention.

It is, of course, not necessary that the diameter specified at the point 7 should actually be at the top, provided that the diameter at 7 be not less than that specified for particular conditions. If the diameter at the top is greater, it merely means that the base exchange material, during operation, will not rise quite to the top of the vessel 1.

Furthermore, it is clear that base exchange material having a greater diversity in the dimensions of the grains and in their natural rates of fall may be employed if the taper of the conical vessel 1 be increased. Such an example is illustrated in Figure 2 where otherwise the same reference numerals have been applied as in Figure 1. It is only necessary that the liquid supply shall be fed at such a rate that at some point 8 the velocity shall be greater than that at which the largest particle of the base exchange material can fall, and that at some other point 7 the velocity shall be such that the smallest particle of the base exchange material shall sink.

Figure 3:
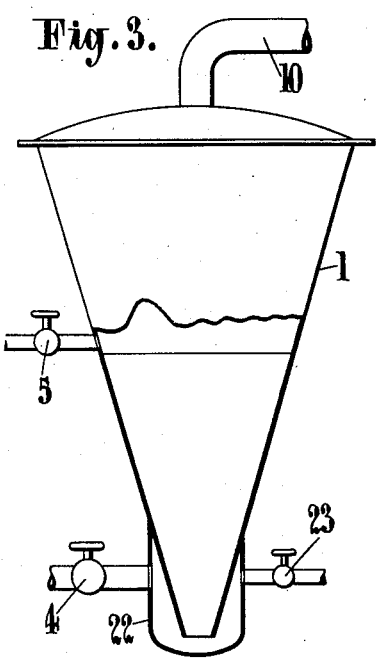
Figure 3 is a similar view showing the same kind of apparatus in rather a more practical form.

In the embodiment shown in Figure 3 the apparatus is in substance the same as in Figure 2. The angle of the cone of the vessel 1 is shown as 33 degrees which is found to be the most favourable when commercial grades of glauconite stabilized by baking are used as the softening material. 4 is the inlet valve for the hard water to be softened which is admitted to a casing 22 surrounding the lower part of the treating vessel 1 to avoid the formation of eddies. 10 represents the outlet for the softened water as before. In this apparatus the inlet valve 5 for the regenerating salt solution is shown at the top of the bed when the latter has been allowed to subside. The rinsings during and after regeneration pass out by way of the valve 23. The apparatus is closed and intended to be used under pressure so that the salt solution entering at 5 is sprayed across the whole of the top of the subsided bed. After regeneration, immediately on opening the valve 4 and closing the valves 5 and 23, the upward velocity of the hard water, of course, carries up the bed entirely into the vessel 1, maintaining it in suspension during the softening period.

It is also unnecessary that the vessel 1 shall be coned or tapered uniformly over its entire length. For example, in Figure 4 the vessel 1 is cylindrical in form, and the expansion 9 is joined to the vessel 1 by a conical portion 11, and the vessel 1 is joined to the supply pipe 12 by a further conical portion 13. The diameters are such that the upward velocity of the liquid in the vessel 1 is less than the rate at which the base exchange material rises in the liquid stream; the velocity of the liquid in the expansion 9 is such that the material falls in the water therein, while the rate of fall of the liquid in the part 13 is greater than the natural rate of fall of the coarsest particle of the exchange material. Thus, all of the exchange material is carried beyond a certain level in the part 13 but cannot rise above the tapered portion 11, and the majority of it is retained in the vessel 1. For example, with the grade of base exchange material referred to in the first example given above, the velocity of flow of the liquid in the part 13 must be above 5 centimeters per second, and the rate of flow in the part 9 must be below 2.5 centimeters per second, the rate of flow in the vessel 1 being between these two values.

Figure 5:
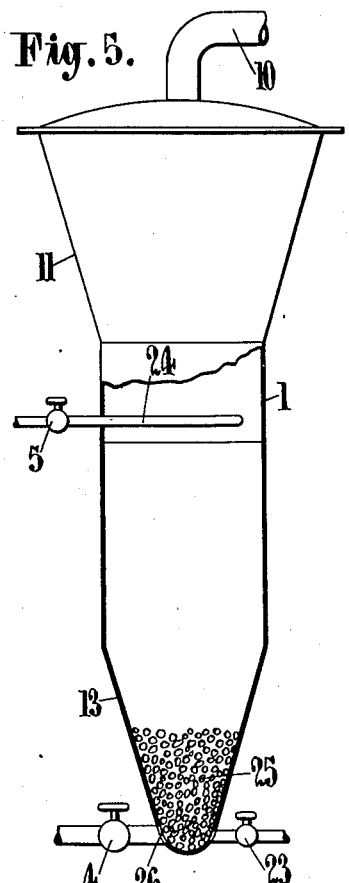
Figure 5 is a similar view of the same kind of apparatus in rather a more practical form.

In Figure 5 is shown a more practical form of the apparatus shown in Figure 4. The valves 4, 5, and 23 perform the same function as the same valves in Figure 3, but as Figure 5 is not intended to be a pressure apparatus the inlet pipe 24 for the salt solution is extended over the whole of the subsided bed to ensure that the latter shall be uniformly treated with the salt solution. A certain amount of porous material such as particles of flint is shown at 25 to prevent the subsided bed passing out at the bottom of the vessel 1. The extreme lower part of the vessel 1 is shown perforated at 26 to allow of passage of liquid but to prevent the loss of the flint 25. Here, again, the angle of the conical portions 11 and 13 is 33 degrees.

In the modified form of the apparatus shown in Figure 6 the main part of the apparatus comprises a container 1 and an expansion 9 with an outflow pipe 10 substantially the same as shown in Figures 1 and 2. Below the vessel 1, however, there are a pair of receivers 14, 15, the diameter of each of which is less than the diameter of the vessel 1 at the throat 8. The receivers 14, 15 are in connection with the vessel 1 through valves 16, 17, and the hard water is introduced to one or other of the vessels 14, 15 alternately through regulating valves $6^a$ and $6^b$ from the pipe 12. Clearly, if the stream of water be disconnected entirely, the base exchange material in the container 1 will fall, due to its own weight, out of the container into one or other of the receivers 14, 15, according to which valve 16 or 17 is open, and then by closing the appropriate valve the material may be isolated in the receiver 14 or 15, which it fills, and may be there regenerated or otherwise treated. The receivers 14, 15 are connected to the drain through valves 18, 19, and to a supply of a regenerating solution through valves 20, 21. In softening water by the apparatus shown in Figure 6, the water may be admitted through valve $6^b$, receiver 15, valve 17, will be softened in the vessel 1, and the soft water will flow out through the pipe 10. The rate of flow of the water is such as to maintain the base exchange material above the throat 8 during the reaction. When the material is exhausted the valve $6^b$ is shut off, and the material immediately falls into the receiver 15. Then the valve 17 is closed and the valves $6^a$ and 16 opened, when another charge of base exchange material previously in the receiver 14 is swept up into the container 1 and softening goes on again. In the meantime, salt solution is admitted at 21, regenerates the material in the receiver 15, and flows out at 19. Then the valve 21 is closed, and water admitted through the valve $6^b$ to wash out the brine in the base exchange material in the vessel 15, and then flows out to waste at 19. The regenerated charge in the receiver 15 is ready to go back into the container 1 when the charge at present therein has dropped into the receiver 14. Thus, the softening and regenerating processes can be carried out nearly in a continuous cycle in the apparatus shown in Figure 6.

Figure 7:
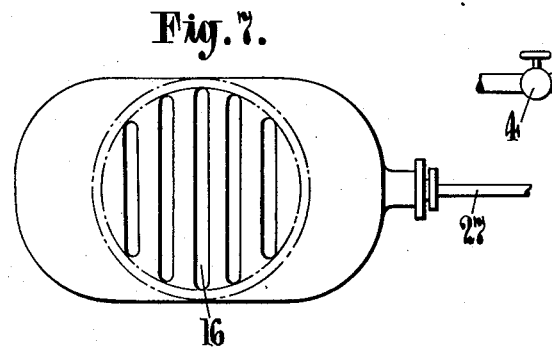
Figure 7 is a plan view.

In Figures 7 and 8 is illustrated in greater detail one suitable form for the valves 16 and 17. The valve is shown as of the shutter or gate type arranged so that the valve 16 can be moved by the handle 27 to slide between upper and lower ported seatings 28, 29. The valve 16 is ported to correspond so that by a small movement it can be fully opened, and by a further small movement fully closed, and yet give a large cross-sectional area to the flowing water.

Figure 9 can be compared directly with Figure 6 and corresponding reference numerals have been applied so that the main parts of the apparatus do not require further detailed description. It may be pointed out, however, that the role of the valves 16 and 17 is here carried out by means of an automatically operated ball valve 30. It can close the seating at the top of the receiver 14, or as shown in Figure 9, the seating at the top of the receiver 15. It has been moved into that position by the rush of the hard water when the valve $6^a$ is opened. Then the base exchange material in the receiver 14 is lifted, and the valve 30 thrust into the position shown, and the base exchange material raised further into the treating vessel 1. Discs of porous stone are shown at 31 to prevent the base exchange particles falling into the valves $6^a$ and $6^b$. Thus, in the position shown in the drawings, the base exchange material has been passed up from the receiver 14 into the treating vessel 1. The hard water admitted through the valve $6^a$ is being softened and flows out at 10. The three-way valve 32 is placed in a position for salt solution to enter from the pipe 33 into the receiver 15 where it regenerates the exchange material therein and flows out to the drain through the valve 34. After regeneration the valve 32 is placed into the position to admit rinsing water from the hard water main through the pipe 35 into the receiver 15 to wash out the brine. Then the valve $6^a$ is shut off, allowing the base exchange material in the treating vessel 1 to subside into the receiver 14, and after closing the valves 32, 34, the valve $6^b$ is opened, raising the regenerated material from the receiver 15 into the treating vessel 1 and throwing over the ball valve 30 to close the receiver 14. The material in the latter is regenerated and washed by appropriate manipulation of the valves 36 and 37.

Although the invention has been described in the particular examples in connection with its application to water softening and to the regeneration of the exchange material, it must be understood that it is not limited to such processes. It is also applicable to other cases wherein reversible adsorption takes place. For example, a known method for removing iron in solution from water consists in employing a zeolite or equivalent body substantially acting as a vehicle for the higher oxides of manganese. Very considerable difficulties are encountered in a filter of this material as the iron oxide liberated from the water clings to the grains of the manganese zeolite and quickly chokes the filter. If such a manganese zeolite is employed, for example in the apparatus illustrated in Figure 1, the reaction goes on perfectly. The particles of the exchange material are constantly in gentle agitation and, apparently, as a result of this, the iron oxide is rubbed off the surface of the grains, and being extremely light, is merely carried away by the rising water flowing over the top of the apparatus, and can be readily separated by filtration. The invention is also particularly applicable to cases in which reversible polar adsorption takes place; for example it may be applied where the exchange material is an adsorptive such as blood-charcoal, the treated material is an aqueous solution such as a solution of picric acid, and the regenerating agent is a less active solvent such as ethyl alcohol. Also, the invention may be applied to processes involving the reversible adsorption of radio active materials such as uranium X.1 by charcoal from aqueous solution wherein solutions of thorium salts and so forth are employed as the regenerating agent.

Having thus described my invention, what I claim as new and desire to secure by Letters Patent is:—

1. An apparatus for carrying out exchange reactions between solid base exchange material and a liquid comprising a container having a portion increasing in cross section upwardly, an inlet near the foot of said container for liquid taking part in the reaction and valve means for producing a velocity of inflow of said liquid sufficiently great to maintain the base exchange material in suspension in the liquid in said container for the desired period, said container having a zone of a sufficiently small cross-section for the upward linear velocity of the liquid to exceed the natural rate of fall of the coarest particles of the base exchange material in the liquid, and a higher zone of sufficiently large cross-section for the linear velocity of upward flow of the liquid to be less than the natural rate of fall of the finest particles of the base exchange material in the liquid.

2. An apparatus for carrying out base exchange reactions between solid base exchange material and a liquid consisting of a container of conical section increasing in cross section upwardly, means for admitting the liquid near the foot of said container and valve means for adjusting the upward rate of flow of said liquid, the dimensions of said container being such that at a smaller cross section the upward flow of the liquid may be of such a rate as to exceed the natural rate of fall of the coarest particles of the exchange material in the liquid and at a large cross section, the velocity of upward flow of the liquid may be less than the natural rate of fall of the finest particles of the base exchange material in the liquid.

3. A water softening plant comprising a conical container, a pair of receivers below said container, valve means allowing liquid in said container to fall into either of said receivers at will, water inlet pipes connected to the foot of each of said receivers, valve means for regulating the flow of water to each of said receivers, an inlet for regenerating salt at the foot of each of said receivers, an outlet for regenerating salt near the top of each of said receivers and valve means for regulating the inflow and outflow of regenerating salt to each of said receivers.

4. An apparatus for carrying out exchange reactions between solid base exchange material and a liquid comprising a container having a portion increasing in cross section upwardly, an inlet to said container near the point of smallest cross section for liquid taking part in the reaction, valve means for producing a velocity of inflow of said liquid sufficiently great to maintain the base exchange material in suspension in the liquid in said container for the desired period, an expanded vessel surmounting said container, and an overflow pipe from said vessel for discharging the treated liquid.

5. An apparatus for carrying out base exchange reactions between solid base exchange material and a liquid, comprising a container of conical section increasing in cross sectional area upwardly, means for admitting the liquid to said container near the point of smallest cross section, and an overflow pipe for the treated liquid near the largest cross section of said container, and valve means for producing an upward flow of said liquid at a sufficient rate to maintain the base exchange material in suspension in the liquid for any desired prolonged period that is to say, at a sufficient rate to afford an upward linear velocity at the point of smallest cross-section sufficient to bear upwardly the coarest particles of the base exchange material and a linear upward velocity at the point of greatest cross-section insufficient to carry the finest paricles of the base exchange material beyond said greatest cross-section.

6. A water softening plant comprising a conical container increasing in cross sectional area upwardly, an inlet for hard water near the smallest cross section of said container, a vessel having a cross section larger than the greatest cross section of said container surmounting said container, an overflow pipe from said vessel for discharging the softened water, valve means for regulating the velocity of upward flow of the water in said container and for shutting off said flow entirely, and means for admitting a regenerating solution to the base exchange material when the latter is exhausted and for allowing said regenerated solution to flow away.

7. A water softening plant comprising a conical container increasing in cross sectional area upwardly, a plurality of receivers below said container, valve means for admitting hard water to any one of said receivers to flow upwardly therethrough into said container, valve means between said container and each of said receivers enabling when opened base exchange material to fall into one of said receivers from which the hard water is turned off, said valve means between said container and said receivers also allowing base exchange material from another of said receivers to be lifted by the upward flow of hard water into the container to enable softening to proceed further, and an overflow pipe from the upper part of said container for discharging the softened water.

In witness whereof I hereunto subscribe my name this 15th day of November, A. D. 1926.

ERIC BERKELEY HIGGINS.